(12) United States Patent
Vicari et al.

(10) Patent No.: US 8,772,220 B2
(45) Date of Patent: Jul. 8, 2014

(54) CHEMICAL DELIVERY PRODUCT AND PROCESS FOR MAKING THE SAME

(75) Inventors: Richard Vicari, Pearland, TX (US); Hang Wang, League City, TX (US); Bret Hann, San Antonio, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 0 days.

(21) Appl. No.: 11/844,464

(22) Filed: Aug. 24, 2007

(65) Prior Publication Data

US 2009/0054295 A1    Feb. 26, 2009

(51) Int. Cl.
*C11D 7/28*    (2006.01)

(52) U.S. Cl.
USPC .............................. 510/380; 510/381; 210/754

(58) Field of Classification Search
USPC .......................... 510/380, 381; 210/754, 745
See application file for complete search history.

(56) References Cited

U.S. PATENT DOCUMENTS

| | | | |
|---|---|---|---|
| 3,474,037 A | 10/1969 | Goldsmith | |
| 3,516,937 A * | 6/1970 | Herrick et. al. | 510/439 |
| 3,528,921 A | 9/1970 | Gray | 252/99 |
| 4,146,676 A * | 3/1979 | Saeman et al. | 428/403 |
| 4,671,972 A * | 6/1987 | Schobel et al. | 427/213 |
| 4,797,221 A | 1/1989 | Gueldenzopf | 252/95 |
| 5,021,186 A | 6/1991 | Ota et al. | |
| 5,851,406 A | 12/1998 | Jones et al. | |
| 6,166,117 A * | 12/2000 | Miyazaki | 524/291 |
| 6,267,808 B1 * | 7/2001 | Grillo et al. | 106/217.7 |
| 6,608,121 B2 | 8/2003 | Isozaki et al. | |
| 6,787,512 B1 | 9/2004 | Verrall et al. | |
| 6,818,709 B1 | 11/2004 | Vicari | |
| 6,956,070 B2 | 10/2005 | Fujiwara et al. | |
| 2004/0002433 A1 | 1/2004 | Buckland et al. | 510/302 |
| 2004/0259749 A1 * | 12/2004 | Braeckman et al. | 510/220 |
| 2005/0040116 A1 | 2/2005 | Purdy et al. | |
| 2005/0065272 A1 | 3/2005 | Vicari | |
| 2005/0155936 A1 * | 7/2005 | Martin et al. | 210/754 |
| 2005/0222355 A1 | 10/2005 | Vicari | |
| 2007/0259996 A1 | 11/2007 | Vicari et al. | |
| 2010/0124586 A1 * | 5/2010 | Becker et al. | 426/61 |

FOREIGN PATENT DOCUMENTS

| | | | | |
|---|---|---|---|---|
| EP | 0 298 222 A2 | 1/1989 | | C11D 3/395 |
| EP | 00 481 547 A1 | 4/1992 | | C11D 17/00 |
| WO | 2005/100525 | 10/2005 | | C11D 3/39 |
| WO | 2006/132729 | 12/2006 | | C11D 3/39 |
| WO | WO 2007 044968 * | 4/2007 | | |
| WO | WO 2007/064681 A2 | 6/2007 | | C22B 26/20 |

* cited by examiner

*Primary Examiner* — Mark Eashoo
*Assistant Examiner* — M. Reza Asdjodi
(74) *Attorney, Agent, or Firm* — Michael W. Ferrell; Ferrells, PLLC; Anna L. Kinney

(57) ABSTRACT

A chemical delivery product for delivering an oxidizing chemical into an aqueous system is disclosed. For instance, in one embodiment, a substrate containing an oxidizing chemical, such as trichloroisocyanuric acid, is coated with a water soluble polymer in order to prevent the oxidizing chemical from degrading prior to use and in order to facilitate handling. In accordance with the present disclosure, a neutralizing agent is contacted with the substrate in order to prevent the substrate from degrading the water soluble coating. In an alternative embodiment, a package is formed from a water soluble film forming composition combined with a base.

48 Claims, No Drawings

CHEMICAL DELIVERY PRODUCT AND PROCESS FOR MAKING THE SAME

BACKGROUND

Various different chemical agents are available that are used for cleaning and disinfecting aqueous systems or for cleaning and disinfecting surfaces and machinery. Many of these chemical agents, for instance, are oxidizing agents. For example, various oxidizing agents are used to treat and/or clean swimming pools, spas, fountains, industrial water systems, toilet tanks, surfaces in either industrial settings or residential settings, laundry and the like. Many of these chemical agents are supplied as a solid either in granular form or in a compressed shape. Examples of such chemicals include, for instance, hypochlorites and halogenated cyanuric acids, such as trichloroisocyanuric acid.

Although the above oxidizing chemical agents are well suited to cleaning, disinfecting, sanitizing and/or treating aqueous systems, difficulties have been encountered in packaging the products for use. For instance, oxidizing chemicals have a tendency to degrade over time. In order to facilitate handling, many oxidizing chemicals are coated with a water soluble substance or packaged in a sealed pouch made from a water soluble film. Problems have been experienced in designing a coating or film capable of protecting the chemical agent while also having desired water soluble properties. For example, many water soluble materials degrade and discolor when contacted with the oxidizing chemicals.

In view of the above, a need exists for further improvements in coatings and films that are used to package chemical agents, such as oxidizing chemicals that are supplied in solid form.

SUMMARY

In general, the present disclosure is directed to a surface treatment for chemical agents, such as oxidizing chemicals, that facilitates coating of the chemical agent with a water soluble material. The surface treatment, for instance, prevents the chemical agent from attacking and/or degrading the coating prior to use. The present disclosure is also directed to a water soluble film capable of packaging oxidizing chemicals that has improved resistance to degradation but yet still has water soluble properties.

For instance, in one embodiment, the present disclosure is directed to a chemical delivery product that includes a substrate comprising an oxidizing chemical. The oxidizing chemical, for instance, may comprise a hypochlorite, a halogenated isocyanurate, a chlorate, a perchlorate, a bromate, a perbromate, a halogenated hydantoin, a perborate, a periodate, a persulfate, a permanganate, a chromate, a dichromate, a nitrate, a nitrite, a peroxide, a ketone peroxide, a peroxy acid, an inorganic acid, or combinations thereof. In one embodiment, for instance, the oxidizing chemical may comprise a trichloroisocyanuric acid.

In accordance with the present disclosure, a neutralizing agent is placed in contact with the outer surface of the substrate. In one embodiment, the neutralizing agent may comprise a reaction product of a base with the oxidizing chemical. As used herein, a base is defined as a substance that is able to give up an unshared pair of electrons to an acid. For example, when the oxidizing chemical comprises a trichloroisocyanuric acid, the reaction product between the base and the oxidizing chemical may comprise a dichloroisocyanuric acid. In an alternative embodiment, the neutralizing agent may comprise a dichloroisocyanuric acid that is, for instance, powder coated onto the substrate.

In order to protect the oxidizing chemical until use, a coating can surround the substrate. The coating may comprise, for instance, a water soluble polymer. For instance, in one embodiment, the coating may comprise a polyvinyl alcohol polymer, such as a vinyl alcohol copolymer. The vinyl alcohol copolymer, for instance, may comprise vinyl alcohol copolymerized with functional comonomer units. The functional comonomer units may comprise sulfonic acid units, carboxylic acid units, vinyl amine units, acrylamide units, dimethyl acrylamide units, salts thereof, or mixtures thereof. In one embodiment, for instance, the functional comonomer units are sulfonic acid units and can include 2-methylacrylamido-2-methylpropanesulfonic acid and/or its sodium salt.

In one embodiment, a saccharide may be combined with a polyvinyl alcohol polymer to form the water soluble coating. The saccharide may comprise, for instance, an oligosaccharide, a disaccharide, a monosaccharide, or mixtures thereof. In one particular embodiment, for instance, the saccharide comprises dextrose.

When the neutralizing agent comprises the reaction product of a base with the oxidizing chemical, the base may comprise any suitable chemical species capable of preventing adverse interactions from occurring between the oxidizing chemical and the polymer coating. The base may comprise, for instance, a hydroxide, a bicarbonate, a carbonate, a phosphate, a silicate, or a borate. In one embodiment, a base is selected that is water soluble.

Particular examples of bases that may be used include potassium bicarbonate, sodium bicarbonate, a Group I or a Group II carbonate salt, or a hydroxide, such as sodium hydroxide, or potassium hydroxide.

In forming the chemical delivery product, in one embodiment, the outside surface of the substrate may be first contacted with the neutralizing agent or the base prior to being coated. Alternatively, the neutralizing agent or base may be directly incorporated into the coating composition. In this embodiment, the neutralizing agent or base contacts the substrate as the substrate is being coated.

In an alternative embodiment of the present disclosure, the chemical delivery product comprises a package made from a water soluble film. The oxidizing chemical is sealed in the package. In this embodiment, for instance, the oxidizing chemical may be in the form of a compressed shape-retentive structure or may be in the form of granules or a powder. In accordance with the present disclosure, the water soluble film used to make the package comprises a polymer combined with a base.

For example, in one embodiment, the water soluble film comprises a polyvinyl alcohol polymer combined with a base as described above. The polyvinyl alcohol polymer may comprise a vinyl alcohol copolymer. In addition to the polymer, the water soluble film may also contain a saccharide.

In one embodiment, the oxidizing chemical contained within the package comprises trichloroisocyanuric acid.

Other features and aspects of the present invention are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a chemical delivery product that contains an oxidizing chemical for use in numerous and diverse applications. The oxidizing chemical, for instance, can be contained in a water soluble package or may include a water soluble coating that dissolves during use in order to release the oxidizing chemical according to a desired rate. The chemical delivery product, for instance, may be used in one embodiment to treat an aqueous system, such as a swimming pool, spa, fountain, or other industrial or residential water supply. The chemical delivery product, for instance, can be made into a unit dose package whereby the package is thrown into a water supply so that the contents disperse in the water as the package dissolves over time.

The present disclosure is particularly directed to forming a water soluble coating onto an oxidizing chemical and/or to a water soluble package that not only has desirable water solubility properties but is also resistant to degradation when contacted with the oxidizing chemical.

In accordance with the present disclosure, a neutralizing agent is contacted with an outer surface of a substrate made from the oxidizing chemical. The neutralizing agent inhibits the oxidizing chemical from degrading or otherwise discoloring a water soluble coating placed over the substrate or a polymer package in which the substrate is held. The neutralizing agent may comprise, for instance, a base, may comprise the reaction product of a base with the oxidizing chemical or may comprise other chemical species depending on the oxidizing chemical being packaged or coated. The neutralizing agent may be used to pre-treat the substrate prior to coating the substrate or placing the substrate in a package. Alternatively, the neutralizing agent may be directly incorporated into the coating composition or into the polymer film used to form the package.

In general, any suitable oxidizing chemical may be incorporated into chemical delivery products in accordance with the present disclosure. The oxidizing chemical, for instance, may comprise a hypochlorite, a chlorate, a perchlorate, a bromate, a perbromate, a perborate, a periodate, a persulfate, a permanganate, a chromate, a dichromate, a nitrate, a nitrite, a peroxide, a ketone peroxide, a peroxy acid, an inorganic acid, or mixtures thereof. In one embodiment, for instance, a halogenated isocyanurate may be used.

Non-limiting examples of suitable oxidizing chemicals include peroxides such as barium peroxide, sodium carbonate peroxide, calcium peroxide, hydrogen peroxide, lithium peroxide, magnesium peroxide, strontium peroxide, zinc peroxide, and sodium peroxide; ketone peroxides such as acetone peroxide, methyl ethyl ketone peroxide, and benzoyl peroxide; nitrates such as aluminum nitrate, potassium nitrate, silver nitrate, calcium nitrate, sodium nitrate, cupric nitrate, lead nitrate, magnesium nitrate, strontium nitrate, nickel nitrate, and guanidine nitrate; nitrites such as sodium nitrite; chromates and dichromates such as potassium dichromate, sodium dichromate, and ammonium dichromate; persulfates such as ammonium persulfate, potassium persulfate and sodium persulfate; perborates such as sodium perborate; perbromates and bromates such as potassium bromate and sodium bromate; permanganates such as potassium permanganates, sodium permanganate, and ammonium permanganate; chlorates and perchlorates including barium chlorate, calcium chlorate, sodium perchlorate (monohydrate), strontium chlorate, magnesium perchlorate, zinc chlorate, sodium chlorate, ammonium perchlorate and potassium chlorate; periodates such as sodium periodate and potassium periodate; chlorites and hypochlorites such as lithium hypochlorite, calcium hypochlorite, and sodium chlorite; chlorinated and/or brominated isocyanurates such as sodium dichloroisocyanuric acid, potassium dichloroisocyanuric acid, and trichloroisocyanuric acid; inorganic acids such as nitric acid, chromic acid, and perchloric acid; peroxy acids such as metachloro-peroxybenzoic acid; bromine, chlorine, iodine and fluorine; potassium superoxide; hydrates of any of the preceding; and combinations of any of the preceding.

The films and coating of the present disclosure are particularly suitable to produce unit dose packaging for sanitizing chemicals such as those used to disinfect pools, spas, and potable water. Sanitizing chemicals include chlorine-containing compounds which produce hypochlorous acid when contacted with water. Hypochlorous acid is the effective sanitizing agent, and the amount of hypochlorous acid which can be produced by a sanitizing chemical relative to chlorine gas ($Cl_2$) is referred to as "available chlorine content." The sanitizing agents may be provided as powder, granules, tablets, liquid, gel, or any other suitable form.

Sanitizing agents include hypochlorite salts such as sodium hypochlorite, calcium hypochlorite, and lithium hypochlorite and chlorinated isocyanurates such as trichloroisocyanuric acid (also referred to as "trichlor"). Salts and hydrates of the sanitizing compounds are also contemplated. The structure for trichloroisocyanuric acid is illustrated below.

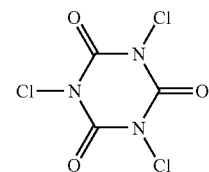

trichloroisocyanuric acid

The form in which the oxidizing chemical is present in the product can vary depending upon the particular application. For instance, when the oxidizing chemical is contained in a package in accordance with the present disclosure, the oxidizing chemical can be in the form of powder, granules, a gel, or even a liquid. When coated in accordance with the present disclosure, however, the oxidizing chemical generally has a compressed shape. For instance, in one embodiment, the oxidizing chemical can have a compressed shape-retentive form and can appear as a tablet, a stick or may have any other suitable shape. Smaller particles, such as granules, may also be coated in accordance with the present disclosure.

When coating a substrate made from an oxidizing chemical in accordance with the present disclosure, the outside surface of the substrate is contacted with, in one embodiment, a base. In general, any suitable base may be used that is capable of preventing or inhibiting the oxidizing chemical from degrading or discoloring a coating applied to the substrate. The base, for instance, may comprise a strong base or a weak base. A strong base, such as sodium hydroxide, is defined as a base that nearly completely dissociates in water. A weak base, on the other hand, is a base that only partially dissociates in water.

Particular examples of bases that may be used to treat the substrate include hydroxides, bicarbonates, carbonates, phosphates, silicates, borates, or mixtures thereof. When using a strong base, for instance, a hydroxide may be used such as sodium hydroxide, potassium hydroxide, or any other suitable hydroxide.

Weak bases that may be used in accordance with the present disclosure include Group I and Group II carbonate salts and bicarbonate salts. For instance, in one embodiment, sodium bicarbonate or potassium bicarbonate may be used as the base. Potassium bicarbonate, for instance, may be desired in certain applications due to its high water solubility properties.

When forming a water soluble coating on a substrate comprising an oxidizing chemical in accordance with the present disclosure, the base is directly contacted with the substrate prior to or during formation of the coating. For example, in one embodiment, the substrate is pretreated with the base prior to being coated with a water soluble material. In this embodiment, the base can be applied to the substrate using any suitable technique.

For instance, in one embodiment, the base can be dissolved in water to form an aqueous solution which is then applied to the substrate. Once the solution containing the base is formulated, the pH of the resulting solution can vary depending upon the particular base that has been utilized. For instance, when using a weak base, the pH of the solution may be from about 7 to about 10, such as from about 8 to about 9. When using a strong base, however, the pH of the solution may be above 10.

The solution can be applied to the substrate using a suitable technique. The basic solution, for instance, can be sprayed onto the substrate, brushed onto the substrate, or the substrate may be dipped into the solution or fed through a curtain coating process. The manner in which the basic solution is applied to the substrate may depend upon the particular oxidizing chemical being treated.

Alternatively, the base may be combined directly with the composition used to form the water soluble coating and applied to the substrate. In this embodiment, the base can be contained in the coating composition in an amount sufficient so that sufficient base contacts the outside surface of the substrate during the coating process.

Once the base is contacted with the substrate, in one embodiment, the base reacts with the outside surface of the substrate to form a reaction product. The reaction product that forms prevents or inhibits the oxidizing chemical from adversely interfering, degrading or discoloring the coating applied to the substrate or a package in which the substrate is held. For example, in one embodiment, the oxidizing chemical may comprise trichloroisocyanuric acid. In this embodiment, the base may react with the trichloroisocyanuric acid to form dichloroisocyanuric acid which is much less reactive and corrosive to outside coatings and packages.

In an alternative embodiment of the present disclosure, especially when treating substrates made from trichloroisocyanuric acid, the substrate may be contacted with dichloroisocyanuric acid as a neutralizing agent. In this embodiment, for instance, the substrate may be powder coated with dichloroisocyanuric acid. For example, in one embodiment, the substrate can be produced by compressing together the oxidizing chemical in a powder or granular form. In one embodiment, the dichloroisocyanuric acid can be compressed around the substrate after the substrate is formed or during formation of the substrate.

Alternatively, the dichloroisocyanuric acid may be applied to a trichloroisocyanuric acid substrate in the form of a slurry.

In general, any water soluble coating or film may be used in conjunction with the neutralizing agent of the present disclosure. The coating applied to the substrate, for instance, can be made from any suitable water soluble material, such as a water soluble polymer. The water soluble coating, for instance, can be made from, in one embodiment, a modified cellulose, such as a hydroxyl methyl cellulose, an ethyl cellulose, and the like.

In an alternative embodiment, the substrate made from the oxidizing chemical can be coated with a polyvinyl alcohol polymer. Water soluble polyvinyl alcohol polymers, for instance, are disclosed in U.S. Pat. No. 6,956,070, U.S. Pat. No. 6,608,121, U.S. Pat. No. 6,166,117, U.S. Pat. No. 6,787,512, and U.S. Patent Application Publication No. 2005/0222355, now U.S. Pat. No. 7,786,229, which are all incorporated herein by reference.

In one embodiment a water soluble polyvinyl alcohol polymer may be used that comprises a copolymer of a vinyl alcohol and functional comonomer units.

Non-limiting examples of the functional comonomer units include hydrophilic monomers such as sulfonic acid units, carboxylic acid units, vinyl amine units, acrylamide, dimethylacrylamide, salts thereof, and combinations thereof. The functional monomer may be present in the copolymer in amounts of from 0.5 to 20 mole percent, with preferred ranges being from 1 to 10 mole percent, or from 2 to 6 mole percent.

Sulfonic acid functionalized PVOH resins are most preferred. Examples of the sulfonic acid monomer units and/or salts thereof include vinyl sulfonic acid, allyl sulfonic acid, ethylene sulfonic acid, 2-acrylamido-1-methylpropanesulfonic acid, 2-methacrylamido-2-methylpropanesulfonic acid, 2-sulfoethyl acrylate, salts thereof, and combinations thereof. Most preferred is 2-acrylamido-2-methylpropanesulfonic acid which is referred to herein as "AMPS". If the salt of the free acid is used it may include sodium, potassium, or ammonium salts, among others. The sodium salt of AMPS is referred to herein as "NaAMPS."

In some embodiments, additional comonomers (i.e., other than the vinyl acetate and the functional comonomer units) may be included in amounts up to about 10 mole percent. Suitable comonomers may include, for example, (meth)acrylates; an olefin such as ethylene, propylene, or butylenes; VeoVa type monomers such as VeoVa 10; and combinations thereof. However, preferably the vinyl alcohol copolymer is 98+% derived from VAM and the functional comonomer acid units.

Various methods of polymerizing vinyl acetate copolymers may be used as are known in the art. Where the functional monomer is sulfonic acid-type units, the resin may be produced by a unique process which is described in copending US Patent Application Publication Nos. 2005/0222355, now U.S. Pat. No. 7,786,229, and 2005/0065272, now U.S. Pat. No. 7,790,815, as well as in U.S. Pat. No. 6,818,709, all to Vicari, the entireties of which are herein incorporated by reference.

Where sulfonic acid comonomer units are used, the saponified copolymer of vinyl alcohol and sulfonic acid component may have, for example, about 1 to about 8 mole % of polymerized sulfonic acid component or salt thereof, about 1 to about 20 mole % of polymerized VAM (PVAc), and about 75 to about 98 mole % of polymerized vinyl alcohol (PVOH), preferably about 2 to about 4 mole % of polymerized sulfonic acid component, about 5 to about 10 mole % of PVAc, and about 85 to about 95 mole % of PVOH. The amount of each polymerized repeating unit is generally determined by $C^{13}$NMR analysis. The copolymer may have a degree of hydrolysis of, for example, about 70 to about 99+%, preferably about 80 to about 95% indicated by $C^{13}$NMR, and a relative molecular weight indicated by a characteristic viscosity of, for example, about 2 to 50 cps, about 3 to about 30 cps, preferably about 7 to about 10 cps.

Commercially available vinyl alcohol/sulfonic acid copolymers that are suitable for use in the present invention may include VYTEK™ 2012 and VYTEK™ 2025 available from Celanese Chemicals (Dallas, Tex.). VYTEK™ 2012 and VYTEK™ 2025 are PVOH/AMPS copolymers that include about 3.5 to 4 mol percent of AMPS monomer. Both grades have a degree of hydrolysis of about 98 to 99 percent, based on the mole percent of hydrolyzed acetate units. Other VYTEK™ resins may also be suitable such as VYTEK™ 2005, VYTEK™ 2035, or VYTEK™ 2045.

In one embodiment, the water soluble coating may contain a saccharide component. For instance, in one embodiment, a saccharide component can be combined with a polyvinyl alcohol polymer, such as a copolymer as described above.

The saccharide component includes at least one water soluble saccharide, i.e., has a solubility in water at 25° C. of at least 0.1 moles per liter. The saccharide component may include polysaccharides, oligosaccharides, disaccharides, monosaccharides, or combinations thereof. Non-limiting examples include glucose (dextrose), galactose, sucrose, fructose, lactose, maltose, mannose, trehalose, and combinations thereof. The saccharide component is preferably a mono- or di-saccharide, and is preferably crystalline; most preferably the saccharide component includes dextrose.

The saccharide component may be present in amounts of from 1 to 40 weight percent. More typically, the formulations can include from about 2 to 25 or 5 to 15 weight percent saccharide.

The composition may further include a chlorine scavenger in amounts of from 0.25 to 5 weight percent, preferably 0.5 to 2.5 weight percent. Suitable chlorine scavengers may include thiosulfate salts such as sodium thiosulfate.

Additional chlorine scavengers may include the following polymers which can be divided into four groups according to their structural construction: polyethylene imines, polyamines, polyamineamides and polyacrylamides, of which the polyethyleneimines, the polyamines and polyamineamides are especially preferred. Other chlorine scavengers herein are anions selected from the group consisting of reducing materials like sulfite, bisulfite, thiosulfite, thiosulfate, iodide, nitrite, etc. and antioxidants like carbamate, ascorbate, etc. and mixtures thereof. Conventional non-chlorine scavenging anions like sulfate, bisulfate, carbonate, bicarbonate, nitrate, chloride, borate, phosphate, condensed phosphate, acetate, benzoate, citrate, formate, lactate, salicylate, etc. and mixtures thereof can be used with ammonium cations. Further exemplary chlorine scavengers include ammonium sulfate (preferred), and primary and secondary amines of low volatility such as ethanolamines, amino acids and their salts, polyamino acids and their salts, fatty amines, glucoseamine and other aminated sugars. Specific examples include tris(hydroxymethyl) aminomethane, monoethanol amine, diethanol amine, sarcosine, glycine, iminodiacetic acid, lysine, ethylenediamine diacetic acid, 2,2,6,6-tetramethyl piperinol, and 2,2,6,6-tetramethyl piperinone. In some embodiments of the invention, the chlorine scavenging agent may be included with the vinyl alcohol copolymer without the saccharide component.

Other components may also be added to the water soluble composition. For example, minor amounts of plasticizing agents may be included (less than 2 percent by weight). As used herein, "plasticizers" refers to any of those generally used as plasticizers for PVOH resins, excluding the saccharide component (the inclusion of the saccharide component may have some plasticizing effect on the film). Specific examples of plasticizers include polyethylene glycol (PEG), trimethylene glycol, propylene glycol, 2,2,4-trimethyl-1,3-pentanediol, pentaerythritol, or glycerine.

The coating formulation may also include other additives in minor amounts such as biocides, fillers, extenders, anti-blocking agents, anti-slipping agents, detackifying agents, anti-foaming agents, UV stabilizers, lubricants, release agents, pigments, dyes, as well as any other known additives in the polymer arts.

As described above, when treating the substrate comprising the oxidizing chemical with a base in accordance with the present disclosure, the substrate can be pretreated with the base or the base may be combined with the coating composition. When combined with the coating composition, the base may be present in the coating composition in an amount from about 0.5 percent to about 65 percent by weight, such as from about 5 percent to about 60 percent, such as from about 15 percent to about 40 percent.

Once the coating composition is formulated, the composition can be used to coat the substrate using any suitable technique. For instance, the coating composition can be sprayed onto the substrate, extruded onto the substrate, or applied using any other suitable method. In other embodiments, for instance, the substrate may be dipped into the coating composition or may be fed through a curtain coating process. In most applications, it is desirable for the coating composition to completely coat the substrate.

As described above, in addition to coating the substrate made from the oxidizing chemical, the present disclosure is also directed to the formation of a sealed package in which the oxidizing chemical is kept. In this embodiment, a water soluble film forming material, such as a polyvinyl alcohol polymer, is used to form a film. The oxidizing chemical in any desired form is then sealed into a package made from the water soluble film.

In accordance with the present disclosure, a base or any other suitable neutralizing agent may be incorporated into the film forming composition during formation of the film. The amount of base incorporated into the film forming composition, for instance, can be the same as described above with respect to the coating formulation. Once incorporated into the film, the base can inhibit degradation of the film when contacting the oxidizing chemical.

For instance, in one embodiment, a base may be blended with a suitable film forming composition. A film can be formed from the composition using any suitable technique. Suitable film forming methods may include, for instance, film casting, wet process film formation, dry process film formation, film extrusion, melting film formation, coating process, and blown film methods.

For instance, in one embodiment, a film can be formed using solution casting processes. In this embodiment, an aqueous solution containing a base and a film forming material is prepared at from about 10 percent solids to about 30 percent solids by weight. The solution is then added to a trough on a metal forming belt and a doctor blade spreads the solution out onto the belt to a pre-determined thickness. The belt is then passed through an oven to evaporate the water, which dries the film to a moisture content of from about 6 percent to about 15 percent. In one embodiment, the resulting polymer film can have a thickness of from about 10 microns to about 200 microns, such as from about 20 microns to about 150 microns, such as from about 50 microns to about 100 microns.

The films can then be formed into a sealed package using any suitable bonding technique. For instance, in one embodiment, a package can be formed by thermally bonding two film layers together. Alternatively, an adhesive may be used to bond the films together or ultrasonic bonding may be used.

The present disclosure may be better understood with respect to the following example.

EXAMPLE

In this example, trichloroisocyanuric acid tablets were coated with a coating composition containing a polyvinyl alcohol polymer, namely a vinyl alcohol/sulfonic acid copolymer sold under the tradename VYTEK by Celanese Chemicals of Dallas, Tex. The coating composition also contained dextrose. In particular, the coating composition contained 90 percent by weight of the polyvinyl alcohol polymer and 10 percent by weight of dextrose.

Various different chemical agents were used to pre-treat the trichloroisocyanuric acid tablets prior to coating or were added directly into the coating composition to determine whether the chemical agent was inhibiting degradation of the coating.

The chemical agents tested in this example included phosphoric acid ($H_3PO_4$), sodium bicarbonate ($NaHCO_3$), potassium bicarbonate ($KHCO_3$), and sodium hydroxide ($NaOH$). Sodium bicarbonate and potassium bicarbonate are weak bases, while sodium hydroxide is a strong base. For purposes of comparison, a control was also made which did not contain any of the above chemical agents but comprised the trichloroisocyanuric acid tablet coated with the polymer composition.

In certain samples, the tablets were pre-treated with the chemical agent. In other samples, the chemical agent was combined directly with the coating composition. In one sample, the tablet was dipped in an aqueous slurry that contained 75 wt % sodium bicarbonate.

To prepare the surface treatment composition, enough of the chemical agent was added to water to achieve the pH that is listed for each sample. When the chemical agent was present in the coating composition, enough of the chemical agent was added to the polymer composition to achieve the pH that is listed for each sample. In samples 11-13, solid sodium bicarbonate or solid potassium bicarbonate was added to a polymer composition to achieve a composition of 55 wt. % of the chemical agent.

In order to apply the coating composition to the tablets, in some samples, the coating composition was sprayed onto the tablets. In other samples, the coating composition was hand brushed onto the tablets.

Once the coating composition was applied to the tablets, the tablets were heated until substantially dry. Each tablet was examined for discoloration after drying. All of the tablets were observed for 30 days to determine if discoloration occurred.

The following results were obtained:

| | Surface Treatment | | | Drying | Coating Material | | | Spray Equipment | |
| --- | --- | --- | --- | --- | --- | --- | --- | --- | --- |
| Sample No. | Solution | Apply Method | pH | Temperature ° F. | Polymer Solution (wt/wt) | % Solids | pH | Nozzle Size | Material (psi) |
| Control | | None | | | Vytek/Dextrose (90/10) | 15% | 6.5 | 4 | 22 |
| 1 | | None | | | Vytek/Dextrose (90/10) + H3PO4 | 15% | 5 | 4 | 45 |
| 2 | | None | | | Vytek/Dextrose (90/10) + H3PO4 | 15% | 3 | 4 | 45 |
| 3 | 8% NaHCO3 Solution | Brushed | 8 | 300 | Vytek/Dextrose (90/10) | 15% | 6.5 | 4 | 22 |
| 4 | 75% NaHCO3 slurry | Dipped in Slurry | 8 | 300 | Vytek/Dextrose (90/10) | 20% | 6.5 | 8 | 70 |
| 5 | | None | | | Vytek/Dextrose (90/10) + 8% NaHCO3 solution + NaHCO3 solid | 15% | 8 | 8 | 12 |
| 6 | 10% NaOH Solution | Brushed | 13 | 125 | Vytek/Dextrose (90/10) | 15% | 6.5 | Hand Brushed | |
| 7 | | None | | | Vytek/Dextrose (90/10) + 10% NaOH solution | 15% | 12 | Hand Brushed | |
| 8 | 85% H3PO4 Solution | Brushed | 3 | 125 | Vytek/Dextrose (90/10) | 15% | 6.5 | Hand Brushed | |
| 9 | | None | | | Vytek/Dextrose (90/10) + 85% H3PO4 | 15% | 2.5 | Hand Brushed | |
| 10 | 8% NaHCO3 Solution | Brushed | 8 | 125 | Vytek/Dextrose (90/10) | 15% | 8 | Hand Brushed | |
| 11 | | None | | | Vytek/Dextrose (90/10) + KHCO3 | 23% | 8 | 8 | 12 |
| 12 | | None | | | Vytek/Dextrose (90/10) + KHCO3 | 23% | 8 | 8 | 12 |
| 13 | | None | | | Vytek/Dextrose (90/10) + KHCO3 | 23% | 8 | 8 | 12 |

| | Spray Equipment | | | | | Dryer Equipment | | | |
| --- | --- | --- | --- | --- | --- | --- | --- | --- | --- |
| Sample No. | Atom (psi) | Fan (psi) | Spray Nozzle Arrangement | Conveyer Belt Speed | How Tablets were sprayed | Oven Temp ° F. | Belt Speed | Number of passes through oven | Appearance Discoloration |
| Control | 80 | 80 | 2-top/angle each side | Med | Top/flip/bottom dried | 125 | 3.5 min | 1 | Yes |
| 1 | 80 | 80 | 2-top/angle each side | Med | Top/flip/bottom dried | 125 | 3.5 min | 1 | Yes |
| 2 | 80 | 80 | 2-top/angle each side | Med | Top/flip/bottom dried | 125 | 3.5 min | 1 | Yes |
| 3 | 80 | 80 | 2-top/angle each side | Med | Top/flip/bottom dried | 125 | 3.5 min | 1 | No |

-continued

| | | | | | | | | | |
|---|---|---|---|---|---|---|---|---|---|
| 4 | 120 | 100 | 2-top/angle each side | Med | Top/flip/bottom dried | 125 | 3.5 min | 1 | No |
| 5 | 45 | 45 | 2-top/angle each side | Med | Top/flip/bottom dried | 125 | 3.5 min | 1 | No |
| 6 | | | Hand Brushed | | | Dried @ 125° F. | | | No |
| 7 | | | Hand Brushed | | | Dried @ 125° F. | | | Yes in some |
| 8 | | | Hand Brushed | | | Dried @ 125° F. | | | Yes |
| 9 | | | Hand Brushed | | | Dried @ 125° F. | | | Yes |
| 10 | | | Hand Brushed | | | Dried @ 125° F. | | | No |
| 11 | 45 | 50 | 2-top/angle each side | Med | Top/flip/bottom dried | 125 | 3.5 min | 1 | No |
| 12 | 45 | 50 | 2-top/angle each side | Med | Top/flip/bottom dried | 125 | 3.5 min | 1 | No |
| 13 | 45 | 50 | 2-top/angle each side | Med | Top/flip/bottom dried rotate 90° & repeat spray/dry cycle | 125 | 3.5 min | 1 | No |

A positive indication of discoloration indicated that the trichloroisocyanuric acid was degrading the coating. All discolorations that occurred were observed within 3 hours of coating the tablets. As shown above, degradation of the coating was inhibited when the tablets were contacted with a base, such as sodium bicarbonate, potassium bicarbonate or sodium hydroxide. As also shown above, the tablet may be pre-treated with the base or the base may be directly combined with the coating material.

In Sample No. 7 above, mixed results were obtained. It is believed that discoloration occurred when the sodium hydroxide and polyvinyl alcohol solution did not completely coat the tablet. When the tablet was completely coated with the solution containing sodium hydroxide, on the other hand, discoloration did not occur.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A chemical delivery product comprising:
a substrate comprising an oxidizing chemical;
an outer surface of the substrate comprising a base selected from the group consisting of: a hydroxide, a bicarbonate, a carbonate, a phosphate, a silicate, and a borate; or a reaction product of the base with the oxidizing chemical; and
a coating surrounding the substrate, said coating comprising a water soluble polymer and a saccharide, wherein said water soluble polymer is a copolymer comprising vinyl alcohol units and functional comonomer units selected from the group consisting of sulfonic acid units, vinyl amine units, salts thereof and combinations thereof;
wherein the coating resists discoloration.

2. A chemical delivery product as defined in claim 1, wherein the substrate has a compressed shape-retentive structure.

3. A chemical delivery product as defined in claim 2, wherein the substrate comprises a tablet or a stick.

4. A chemical delivery product as defined in claim 1, wherein the oxidizing chemical is selected from the group consisting of a hypochlorite, a chlorinated or brominated isocyanurate, halogenated hydantoins, a chlorate, a perchlorate, a bromate, a perbromate, a perborate, a periodate, a persulfate, a permanganate, a chromate, a dichromate, a nitrate, a nitrite, a peroxide, a ketone peroxide, a peroxy acid, an inorganic acid, or mixtures thereof.

5. A chemical delivery product as defined in claim 1, wherein the oxidizing chemical comprises dichloroisocyanuric acid or trichloroisocyanuric acid.

6. A chemical delivery product as defined in claim 5, wherein the outer surface of the substrate comprises the reaction product of the base with the oxidizing chemical, the reaction product comprising dichloroisocyanuric acid.

7. A chemical delivery product as defined in claim 1, wherein the oxidizing chemical comprises a hypochlorite salt.

8. A chemical delivery product as defined in claim 1, wherein the base comprises potassium bicarbonate, sodium bicarbonate, or mixtures thereof.

9. A chemical delivery product as defined in claim 1, wherein the saccharide comprises an oligosaccharide, a disaccharide, a monosaccharide, or mixtures thereof.

10. A chemical delivery product as defined in claim 1, where the saccharide comprises an oligosaccharide.

11. A chemical delivery product as defined in claim 1, where the saccharide comprises a monosaccharide.

12. A chemical delivery product as defined in claim 1, where the saccharide comprises a disaccharide.

13. A chemical delivery product as defined in claim 1, where the saccharide comprises dextrose.

14. A chemical delivery product as defined in claim 1, wherein said functional comonomer units comprise 2-methylacrylamido-2-methylpropanesulfonic acid, a sodium salt thereof, or mixtures thereof.

15. A chemical delivery product as defined in claim 1, wherein the oxidizing chemical comprises trichloroisocyanuric acid or a hypochlorite salt, and wherein the base comprises potassium bicarbonate, sodium bicarbonate, or mixtures thereof.

16. A chemical delivery product comprising:
a package made from a water soluble film, the water soluble film comprising (i) a copolymer comprising vinyl alcohol units and functional comonomer units selected from the group consisting of sulfonic acid units, vinyl amine units, salts thereof and combinations thereof, (ii) a saccharide and (iii) a base selected from the group consisting of a hydroxide, a bicarbonate, a carbonate, a phosphate, a silicate, and a borate; and an oxidizing chemical sealed in the package;

wherein the film is resistant to discoloration.

17. A chemical delivery product as defined in claim 16, wherein the oxidizing chemical is selected from the group consisting of a hypochlorite, a chlorinated or brominated isocyanurate, halogenated hydantoins, a chlorate, a perchlorate, a bromate, a perbromate, a perborate, a periodate, a persulfate, a permanganate, a chromate, a dichromate, a nitrate, a nitrite, a peroxide, a ketone peroxide, a peroxy acid, an inorganic acid, or mixtures thereof.

18. A chemical delivery product as defined in claim 17, wherein the oxidizing chemical comprises a hypochlorite salt.

19. A chemical delivery product as defined in claim 17, wherein the oxidizing chemical comprises dichloroisocyanuric acid.

20. A chemical delivery product as defined in claim 17, wherein the oxidizing chemical comprises trichloroisocyanuric acid.

21. A chemical delivery product as defined in claim 16, wherein the base comprises a bicarbonate.

22. A chemical delivery product as defined in claim 21, wherein the base comprises potassium bicarbonate, sodium bicarbonate, or mixtures thereof.

23. A chemical delivery product as defined in claim 16, wherein said functional comonomer units comprise 2-methylacrylamido-2-methylpropanesulfonic acid, a sodium salt thereof, or mixtures thereof.

24. A chemical delivery product as defined in claim 16, wherein the saccharide comprises an oligosaccharide, a disaccharide, a monosaccharide, or mixtures thereof.

25. A chemical delivery product as defined in claim 16, where the saccharide comprises an oligosaccharide.

26. A chemical delivery product as defined in claim 16, where the saccharide comprises a monosaccharide.

27. A chemical delivery product as defined in claim 16, where the saccharide comprises a disaccharide.

28. A chemical delivery product as defined in claim 16, where the saccharide comprises dextrose.

29. A chemical delivery product comprising:
a substrate comprising an oxidizing chemical; and
a coating surrounding the substrate, the coating comprising a saccharide, a base selected from the group consisting of: a hydroxide, a bicarbonate, a carbonate, a phosphate, a silicate, and a borate; and a water soluble copolymer comprising vinyl alcohol units and functional comonomer units selected from the group consisting of sulfonic acid units, vinyl amine units, salts thereof and combinations thereof;
wherein the coating is resistant to discoloration for at least 30 days after application to the substrate.

30. A chemical delivery product as defined in claim 29, wherein the oxidizing chemical is selected from the group consisting of a hypochlorite, a chlorinated or brominated isocyanurate, halogenated hydantoins, a chlorate, a perchlorate, a bromate, a perbromate, a perborate, a periodate, a persulfate, a permanganate, a chromate, a dichromate, a nitrate, a nitrite, a peroxide, a ketone peroxide, a peroxy acid, an inorganic acid, and mixtures thereof; and the base is selected from the group consisting of a hydroxide, a bicarbonate, a carbonate, a phosphate, a silicate, a borate, and mixtures thereof.

31. A chemical delivery product as defined in claim 29, wherein the oxidizing chemical comprises trichloroisocyanuric acid.

32. A chemical delivery product consisting essentially of:
a substrate comprising an oxidizing chemical, an outer surface of the substrate in contact with a coating;
an inner layer of the coating comprising a base or reaction product of the base and the substrate, the base selected from the group consisting of: a hydroxide, a bicarbonate, a carbonate, a phosphate, a silicate, a borate, and mixtures thereof; and
an outer layer of the coating resistant to discoloration and comprising a saccharide and a water soluble copolymer comprising vinyl alcohol units and functional comonomer units selected from the group consisting of sulfonic acid units, vinyl amine units, salts thereof and combinations thereof.

33. A chemical delivery product as defined in claim 32, wherein the copolymer comprises 75 to 98 mol percent vinyl alcohol units.

34. A chemical delivery product as defined in claim 32, wherein the copolymer comprises 0.5 to 20 mole percent sulfonic acid comonomer units.

35. A chemical delivery product as defined in claim 32, wherein the copolymer comprises 2-acrylamido-2-methylpropane sulfonic acid or a sodium salt thereof.

36. A chemical delivery product as defined in claim 32, wherein the copolymer has a characteristic viscosity of 2 cps to 50 cps.

37. A chemical delivery product as defined in claim 32, wherein the copolymer has a degree of hydrolysis of from about 98 percent to over 99 percent as indicated by $C^{13}$ NMR analysis.

38. A chemical delivery product as defined in claim 32, wherein the saccharide is selected from the group consisting of an oligosaccharide, a disaccharide, a monosaccharide, and mixtures thereof.

39. A chemical delivery product as defined in claim 32, wherein the saccharide is selected from the group consisting of dextrose, galactose, sucrose, fructose, lactose, maltose, mannose, trehalose, and combinations thereof.

40. A chemical delivery product as defined in claim 32, wherein the saccharide is present in amounts of from 1 to 40 weight percent.

41. A chemical delivery product as defined in claim 32, wherein the outer layer of the coating exhibits a thickness from about 10 to about 200 microns.

42. A chemical delivery product as defined in claim 32, wherein the outer layer of the coating has a moisture content of from 6 to 15 weight percent.

43. A chemical delivery product as defined in claim 32, wherein the base is present in an amount of 0.5 to 65 weight percent based on the weight of the substrate.

44. A chemical delivery product for delivering an oxidizing chemical into an aqueous system, comprising:
a package consisting essentially of a water-soluble copolymer of a vinyl alcohol monomer and a sulfonic acid monomer or sodium salt thereof and a saccharide; and
a pretreated substrate, comprising an oxidizing chemical in direct contact with a neutralizing agent selected from the group consisting of: a hydroxide, a bicarbonate, a carbonate, a phosphate, a silicate, and a borate, sealed in the package, wherein the neutralizing agent effectively inhibits degradation and discoloration of the package by the oxidizing chemical.

45. A chemical delivery product comprising:
a substrate comprising a trichloroisocyanuric acid oxidizing chemical;
an outer surface of the substrate comprising a dichloroisocyanuric acid; and a coating disposed on an outer surface of the substrate, the coating comprising: a water-soluble copolymer selected from the group consisting of a sulfonic acid functionalized polyvinyl alcohol and a vinyl amine-functionalized polyvinyl alcohol, and a monosaccharide;
wherein the coating resists discoloration for at least 30 days from application to the substrate.

46. A chemical delivery product as defined in claim 45, wherein the outer surface of the substrate is formed as a reaction product between the substrate and a base.

47. A chemical delivery product comprising:
a chlorinated isocyanurate substrate,
an outer surface of the substrate in contact with a coating;
an inner layer of the coating comprising a base selected from sodium bicarbonate, potassium bicarbonate, and sodium hydroxide; and
an outer layer of the coating resistant to discoloration and comprising a water-soluble, sulfonic acid-functionalized polyvinyl alcohol copolymer and dextrose.

48. A chemical delivery product comprising:
a substrate comprising an oxidizing chemical;
a coating surrounding the substrate, the coating comprising a saccharide and a water soluble copolymer, the copolymer comprising vinyl alcohol monomer units and functional comonomer units selected from the group consisting of sulfonic acid monomer units, vinyl amine units, salts thereof and combinations thereof;
wherein the chemical delivery product coating resists discoloration for at least 30 days from application to the substrate due to preparation selected from the group consisting of: pretreating the substrate with a solution or slurry having a pH of at least about 7 and raising the coating pH to greater than about 6.5.

* * * * *